United States Patent [19]

Daoud

[11] Patent Number: 4,844,932
[45] Date of Patent: Jul. 4, 1989

[54] SEPARATION OF WORT FROM MASH

[75] Inventor: Iyadh S. Daoud, Crawley, England

[73] Assignee: The Brewing Research Foundation, Surrey, England

[21] Appl. No.: 108,786

[22] Filed: Oct. 15, 1987

[30] Foreign Application Priority Data

Oct. 20, 1986 [GB] United Kingdom ............... 8625070

[51] Int. Cl.[4] .................. B01D 13/00; C12C 11/00
[52] U.S. Cl. ................... 426/489; 210/651; 426/495
[58] Field of Search ........... 426/489, 495; 210/651, 210/323.2, 778

[56] References Cited

U.S. PATENT DOCUMENTS

| 3,161,522 | 12/1964 | Compton | 426/489 |
| 4,197,321 | 4/1980 | Chyba et al. | 426/489 |
| 4,272,374 | 6/1981 | Baker | 210/195.1 |
| 4,624,780 | 11/1986 | Chang | 210/195.1 |
| 4,724,080 | 2/1988 | Dau et al. | 210/651 |

Primary Examiner—George Yeung
Attorney, Agent, or Firm—Frishauf, Holtz, Goodman & Woodward

[57] ABSTRACT

A barrier cross-flow separation method is used to separate wort from mash in beermaking. The separator medium is preferably a cylindrical element with an internal diameter of at least 20 mm and a pore size in a range of from 10 $\mu$m to 100 $\mu$m. High gravity wort is obtainable from a four-step separation process which can handle mash free of husk and including large amounts of cereal adjunct. The wort may be clarified in a subsequent filtering step.

12 Claims, 4 Drawing Sheets

SEPARATION OF WORT FROM MASH

FIELD OF THE INVENTION

The production of beverages from grain, notably beer, involves many unit operations performed sequentially. The main stages include mashing, wort boiling and cooling, fermentation and conditioning. Each of these operations is followed by a separation stage. In beer making, the wort separation stage which follows mashing is regarded as the most critical and most difficult. It is this wort separation stage to which the present invention relates.

BACKGROUND OF THE INVENTION

The brewer uses as his primary raw materials malted barley (malt), water (liquor) and hops. Mashing involves the intimate mixing of ground malt with hot water to produce an aqueous extract of the malt called "wort" or "sweet wort". There are several methods of mashing. In an infusion mashing system, the mash is typically held at 65° C. for a period of between 30 minutes to several hours. During this periods, enzymes of the malt attack principally starch and its degradation products (this is referred to as amylolysis). The production of wort takes place in a vessel, called a mash tun, which has a slotted base which acts like a sieve. In order to wash virtually all the sweet wort from the undergraded material, hot water at 70°-79° C. is sprayed over the surface of the mash and the wort is allowed to drain out of the solids of the mash bed. Hence, both the mashing and wort separation are achieved within the same unit.

In the other available systems of wort preparation, the mashing is carried out, with stirring, in a jacketed vessel in which the mash temperature can be progressively increased to the required maximum value. For example, in the production of a lager beer, mashing might comprise (i) 40 minutes at 50° C., (ii) 35 minutes to reach 65° C., (iii) 45 minutes at 65° C., (iv) 20 minutes to reach 75° C. (see Spillane, M. H., Brewer's Guardian, 1978, 4, 63). In these plants, the mash is transferred to a wort separation (otherwise called "lautering") stage. The lautering systems which are now in use include: Lauter Tun, Strain Master or Mash Filter. Another system which is at the industrial assessment stage is the High Pressure Mash Filter.

In all these separation systems, separation of the wort is achieved by using a bed of the malted grain itself as the filter medium. There is in such systems a basic incompatibility between filtration rate and extraction efficiency (see Royston, M. G., J. Inst. Brewing, 1966, 77, 351). The rate of filtration increases as the particle size is increased and the bed depth is decreased, but the amount of soluble extract recovered from the grain will tend to increase as the particle size decreases and the bed depth increases. Prediction of system performance is difficult. System design is based on empirical procedures. Experience teaches that precise limits must be adhered to with respect to malt quality, the method of milling of the malt and the method of operation used during wort separation. Constant operator attention is essential in order to avoid worts which are cloudy and mashes which become set.

An increase in the percentage conversion of starch into fermentable sugars during mashing could be achieved if a finer grind of malt flour were to be used. An increase in the percentage recovery of soluble extract would lead to large savings in production costs. There is, however, a limit in the fine milling of malt beyond which the present systems become inoperable.

It is one object of the present invention to provide a separation system which functions efficiently with finer grinds of malt flour than are acceptable for the above-mentioned separation systems.

The presence of husk particles in the mash is essential for the present wort separation systems to be made operational. The husks allow the permeation of wort or sparge liquor (water) through the mash bed. Without this, the mash would be likely to set. Recovery of the soluble extract from the mash bed is achieved by (a) displacement of the strong wort with hot liquor (water) and (b) cake washing (sparging). The sparging step should extract the wort residing within the voids of the mash bed and within the solid particles. Since husk particles are cellulosic in nature the mass transfer of soluble extract from within those particles will be diffusion limited. Hence the presence of the husk particles limits the rate of separation of wort from the mash.

It is another object of the present inventions to avoid the need for husk particles to be present in the mash.

Present demands on the brewing industry suggest that the cost of raw materials will continue to increase and the market will require an ever wider range of beers. The first factor imposes a demand that the brewer works with a greater variety of feedstocks. The second factor requires the use of equipment which can perform satisfactorily at reduced load capacity. Feedstock characteristics depend on, for example, year to year variations in barley varieties, changes in the degree of malt modification, increases in the amount of unmalted materials added to the grist, and the use of non-traditional materials such as wheat malt and sorghum malt. It is another object of the present invention to go some way at least towards meeting these demands.

Apparatus for liquid-solid separation with continuous mashing systems has from time to time been proposed. These proposals include: a vacuum drum filter (see U.S. Pat. No. 2,127,759 (1938); batteries of centrifuges (see Williamson, A. G. and Brady, J. T., Tech. Q. Master Brewers Assoc., Am., 1965, 2, 79); cyclones and vibrating-screens.

Despite their deficiencies, the existing systems, in which filtering is through the grain bed, are still the methods of choice.

One of the main areas of recent efforts to optimize wort separation is improvements in the milling of the malt to provide a grain filter bed with a more easily reproducible and predictable filtering performance. For example, wet-milling can provide an efficient bed of essentially whole empty grain husks. With dry-milling, filter performance improves if the particle size of the broken husks can be kept more uniform.

For most brewers, the Lauter Tun is still the preferred equipment for wort separation. Improvements in its performance are currently being sought by careful attention to the design detail of the raking and sparging equipment of the Lauter Tun.

SUMMARY OF THE INVENTION

According to the present invention, there is provided a method of preparing an infusion (wort) from malted grain, which copmrises the steps of mashing the malted grain to provide a spent grain/wort mash, and separating the wort from the spent grain; the method being characterized in that the step of separation is a barrier filtration method accomplished by flowing the spent grain/wort mash across the surface of a wort-permeable filter element having a pore diameter in a range of from 10.0 to 100.0 μm to permit wort (but not spent grain) to pass as filtrate through the filter in a direction transverse to the direction of said flow.

It will be usually necessary, from time to time, to reverse the flow of filtrate through the filter to flush from the surface of the filter element which is in contact with the mash such particulate matter within the mash as has become resident on the said surface or is clogging the pores of the filter.

The use of a cross-flow filter element should permit the use of finer grinds of malt flour than are acceptable in grain bed filtration techniques. Careful choice of the material of the filter element should reduce the degree of cloudiness in the wort, and a cross-flow filtration technique has inherently greater flexibility in regard to batch size. With the present invention, malt flour with or without husk particles can be used for mashing.

Cross-flow filter elements of various configurations e.g. tubular, flat sheet and spiral wound are known per se. GB-A-No. 2176715 describes the use of a ceramic cross-flow filter with a pore size of less than 10 μm for filtering of beer tank residues. Tubular microfilters are commercially available with an inside diameter of 6 mm, which is usually the optimum for existing applications, but a diameter of at least 10 mm is necessary in wort separation, if blockage of the tube is to be avoided, and the inside diameter is preferably not less than 20 mm.

Of the few materials acceptable for use in construction of brewing plant is stainless steel. This material, however, is one from which it is readily possible to make filter elements of the desired pore diameter, and it is therefore likely to be a favoured material for this application. It is anticipated that it will be possible to clean such filters, in between brewing runs, by using the same sorts of detergent (acid or alkali), as are presently used on other items of brewing equipment. Ceramic filters, or filter cloths, could also withstand the operating conditions of a brewing plant.

In order to avoid blockage of the filter element, the mash should be circulated at relatively high velocity past the filtering surface. The velocity may be in a range from 2 to 8 m/s, preferably 4 to 6 m/s. For the same reason, the differential pressure applied across the filter element should be kept relatively small, preferably in a range of from 35 to 210 kPa (5 to 30 psi) most preferably 35 to 70 kPa (5 to 10 psi).

Using a cross-flow filter in accordance with the invention, a two step wort extraction procedure is contemplated. In the first step, the mash is advanced around a circuit which includes a mashing vessel and the cross-flow filter, passage of filtrate through the filter element being balanced, to retain a constant solid-liquid ratio in the circulating mash, by addition of make-up sparge liquor (e.g. warm water) to the circuit. Subsequently, in a second step which begins at a specific point in the course of separation of wort from the mash, volume is no longer maintained constant, but is allowed to become smaller, thereby thickening the mash residues until they are too thick to continue to pump around the circuit, at which point they are pumped out of the circuit.

A four-step wort extraction procedure is, however, considered preferable to the above two-step process.

In the *first* step, the mash is advanced around the circuit and passage of initial filtrate (strong wort) through the filter element is allowed to continue without any addition of make-up sparge liquor (water). The mash volume is reduced to about 40–60% of its original value. In the *second* step, sparge liquor is added to the mash in order to recover the soluble wort extract remaining in the mash. The rate of addition of liquor is lower than the filtrate (wort) extraction rate so as to maintain a pre-determined sparge-to-wort ratio and hence the specific gravity of the wort.

When the filtrate (wort) specific gravity reaches a prescribed minimum value, the *third* step begins. The weak wort produced with continued addition of sparge liquor is diverted to a buffer tank which provides liquor for the next mash. At the start of the *fourth*, and final, step, addition of sparge liquor is terminated. Passage of weak wort through the filter is continued until the exhausted mash (spent grains) becomes too thick to continue to pump easily around the circuit, at which point it is pumped out of the circuit.

Clarification of the wort obtained by the above described process may be beneficial, as explained below.

Typically, brewery mash is made up by mixing liquor (water) and grist (malt flour) in a ratio which can be in the range of 2.5 to 3.7. After the mashing process has been completed, the resultant mash consists of wort (soluble extract in water) and grains of unconverted solids. The suspended solids content of the mash and the gravity of its wort depend on the liquor-to-grist ratio used. For example, the suspended solids content of a brewery mash with a 3.3:1 liquor-to-grist ratio is about 7.5% w/v and the specific gravity of its wort is 1.072. In the context of solids separation by filtration, a brewery mash has a high solids content. The particle size of the grains in the mash, which have to be separated from the wort, depends largely on the type and degree of milling employed. Sieve analysis of ale malt flour obtained by milling in a single roller mill with a roller gap of 0.635 mm showed that it contained particles in the range of 0.25 mm to 2.00 mm. It is expected that the majority of solids particles in the mash would also vary in size and could be in the range of 1 μ to 2 mm. Some sub-micron particles would also be present in the mash.

The pore diameter of the cross-flow filter medium employed determines the initial size and amount of particles filtered out of the wort. The resistance to wort flow increases as the pore size of the filter decreases, with consequently reduced flow rate of wort from the filter. This permeate rate (L wort per $m^2$ filter area per hour) is also affected by the amount of solids present in the feed (mash) stream. A high solids loading on the filter causes a reduction in the permeate rate achieved. In order to make a process of cross-flow microfiltration more economically viable, therefore, it could be advantageous to separate wort from mash in a two stage process, wherein a cross-flow filter is used first to separate the bulk of the large-sized particles, and then a fine filter (which may or may not be a cross-flow filter) is used in a second stage to remove smaller particles not removed by the first stage filter.

For the first stage, a high percentage (typically 65 to 90%) of the total suspended solids could be removed by the use of a filter with a pore size of from 10 to 100μ, preferably 40 to 80μ. Preferred filter materials comprise stainless steel mesh, porous plastics and ceramics materials and filter cloths. A tubular filter is preferred. The inside diameter of tubular filters may be from 10 mm to 75 mm, preferably 20 mm.

The liquor-to-grist ratio and amount of sparge liquor used determines the final wort gravity. By adjustment of these parameters, the first separation stage can provide wort both with a relatively high gravity and with a high extract yield (at least 95–96% of the laboratory extract value). As will be seen later, with recycling of the last runnings, very high extract recovery can be attained.

The wort produced in the first stage would have some suspended solids present in it. Those solids are then removed in the second stage. Since the solids content of "first stage" wort is low (generally less than 2.6% w/v), and because extract recovery by sparging is not required in this second stage, separation need not be accomplished by cross-flow microfiltration but can instead be by employing other (conventional) solids separation systems such as a sand filter, a plate and frame filter or a centrifuge.

When using cross-flow filtration, for the second stage, tubular filters of small diameters of 4 to 6 mm would be suitable because of the low solids content of the wort. It is not likely in this case that the small diameter filter tubes would block-up with solids as might occur with a mash feed.

The aim in the second stage is to polish-up the wort obtained from the first stage. Hence, the separation of solids from the wort by cross-flow or other conventional filtration methods is not different from that encountered in the filtration of wine, apple juice or beer. For a cross-flow system, the optimum conditions of operation such as: feed circulation velocity and differential pressure (applied across the membrane) will differ from those employed in the first stage and can easily be established in the normal way for the filter medium chosen. Similarly, the best operating conditions can be established when a conventional filtration system (e.g. filter press) is selected for this wort clarification step.

It may be more advantageous, from the point of view of ecnomics, to consider the use of a multi-stage system.

The second cross-flow stage may be carried out in two sub-stages. The wort being clarified may be fed to a primary separation stage in which it is circulated past the filter membrane. The permeate would constitute the bulk of the clarified wort, while the material retained by the filter would have a high suspended solids content. A proportion of the retained material would be passed onto a secondary filtration stage to recover more wort and raise the solids content of the retained material to a high level.

Using the present system, the clarity of the wort produced is under the control of the brewer. Once this wort clarity has been specified, the first stage filtration system and the second stage system can be designed to meet the desired criteria. For example, the appropriate pore-size of the cross-flow membrane filter can then be specified. The operation of such a filter can be carried out with or without back flushing. This will depend on the velocity at which the feed is circulated past the microfiltration membrane.

The system has other advantages which include: ease of automation and control; modular construction is possible; flexibility in feed batch size; and high ($>1.045$) specific gravity worts.

BRIEF DESCRIPTION OF THE DRAWINGS

For a better understanding of the invention, and to show more clearly how it may be carried into effect, reference will now be made, by way of example, to the accompanying drawings, in which.

DETAILED DESCRIPTION OF ILLUSTRATED EMBODIMENTS

Figure 1:
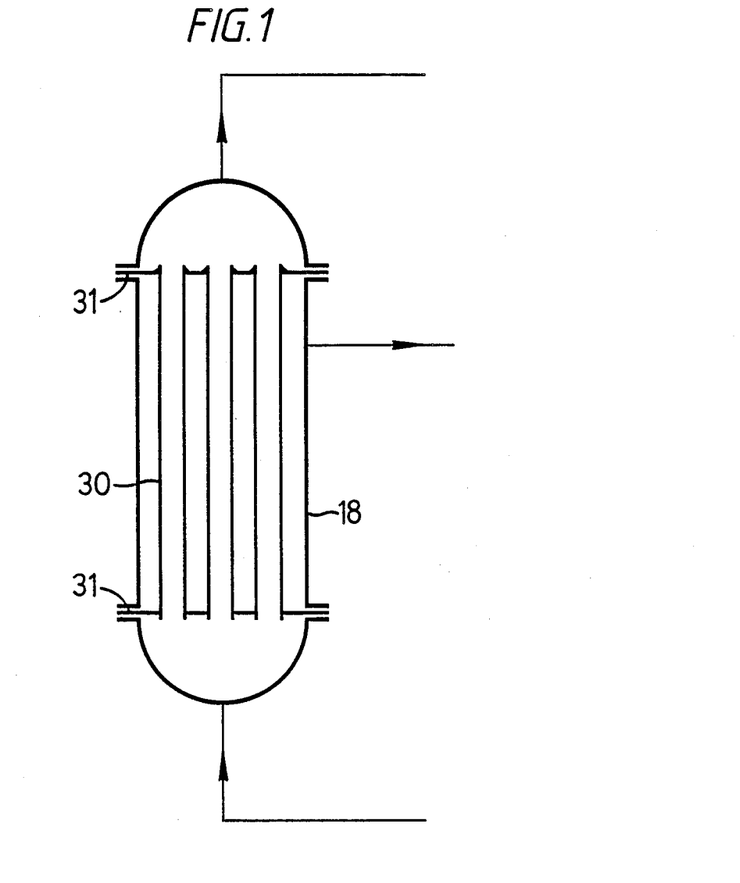
FIG. 1 is a diagrammatic longitudinal diametral section of a tube and shell filter unit.

Referring to FIG. 1, various tubular filter media 30 can be housed in the filter shell 18. The arrangement for the support of filter tubes 30 (which can be made for example of metal mesh, porous metal or ceramic materials) may be that used in shell and tube heat exchangers, in which the tubes 30 are fixed in position by two header plates 31. Tubular filter cloths carried on metal supports is another possibility.

Conditions of high temperature (70°–80° C.) and pressures up to 5 bar will occur during wort separation. The effect on the left of otherwise suitable filter media may be adverse. Preferably, the filter media will be resistant to the sorts of detergent which are used conventionally in between production runs in brewery plant to remove the fouling and sediment which builds up during the run, so that the filter media can be cleaned in situ in between production runs.

The cross-flow filter will be able to handle a wider range of unmalted materials in the grist, and a higher proportion of such materials, than can be grain bed filter systems. It appears that a relatively high rate of flow of filtrate through the filter, and a large filter area, can both be achieved. This is particularly the case where the wort/grist feed is advanced in a more-or-less straight line through the filter assembly so as to avoid any dead spots where solids tend to accumulate. The wort/grist should be fed through the tubes of the shell and tube filter, not the shell. Hence a high plant throughput should be possible, with a greater number of brews per day.

The illustrated filter tubes are of stainless steel mesh with a pore size of 80 $\mu$m and the inside diameter of each tube is 20 mm.

Figure 2:
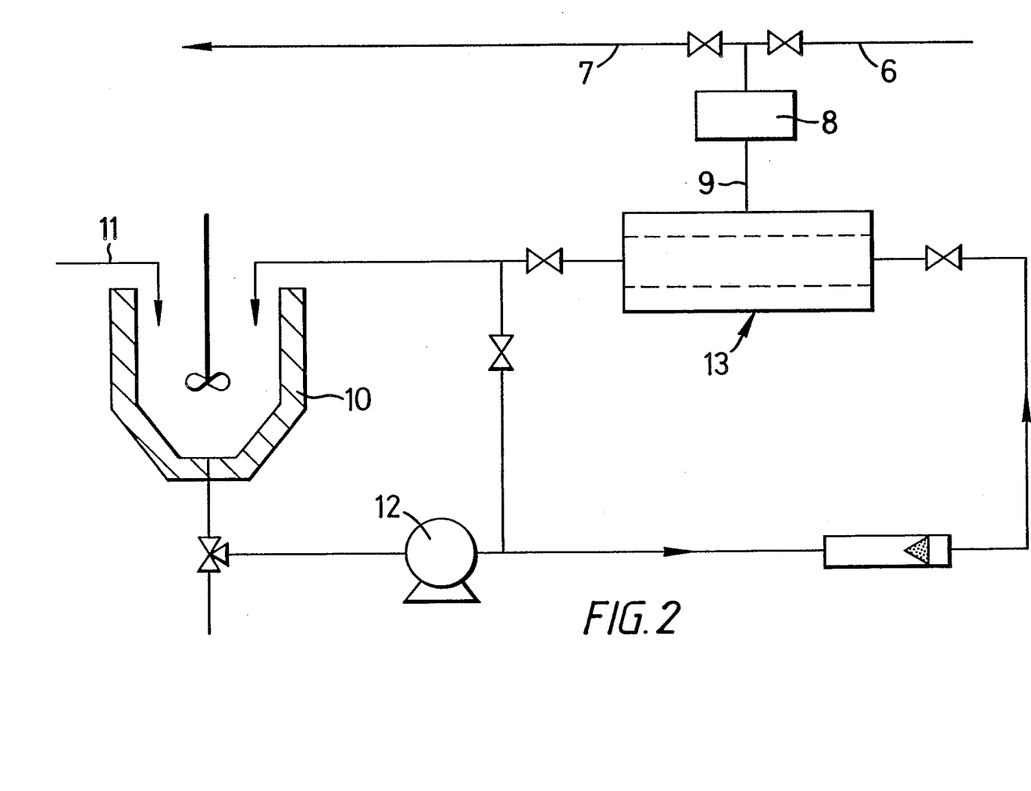
FIG. 2 is a diagram of a wort separation circuit in accordance with the present invention.

Referring to FIG. 2, mashing is performed in the normal way in a jacketed mashing vessel 10 where malt grist (milled malt) and hot liquor (water) 11, and optionally including cereal adjunct (for example, maize or wheat), are stirred and allowed to stand at the required temperatures and for a sufficient period of time to achieve the desired enzymatic conversion. The mash is pumped by a pump 12 from the vessel 10, through a tubular filter 13, and back to the mashing vessel. Separation of the wort 9 occurs at the filter 13 tending to reduce the volume of the mash. The wort filtrate 9 flows to a reservoir 8 and then through a T-junction to a line 7. Back flushing of the filter 13 can be effected by delivering compressed nitrogen to the reservoir 8 along a line 6.

In the first step of a two-step separation stage, the mash is restored to its original volume by addition of sparge liquor 11 (hot water) to the vessel 10. In the second step, after a majority of the total soluble matter has been extracted from the mash, no more liquor is added, but the circulation of the spent grains feed (i.e. final mash containing little or no soluble extract) through the filter 13 is maintained, in order to filter off the last runnings (very low gravity wort) and thicken the spent grain residues. How dry are the spent grains produced will depend to a large extent on the capability of the pumping system employed and the characteristics of the filter material. The spent grains are then discharged from the system leaving it ready for cleaning before another cycle of separation is carried out.

In a four step process, the steps are as follows:

Step (1): Separation of strong wort

It is advantageous to separate as much strong wort as possible initially without any back-addition of sparge liquor to the mash, in order to obtain wort which, in the aggregate, is of higher gravity.

Step (2): Recovery of extract from mash by cake washing (sparging)

After the removal of strong wort from the mash has been completed in Step (1), extract of the same gravity as the last collected wort is left residing within the voids of the mash bed (i.e. between the solids particles) and also within the particles themselves. In order to recover this extract, cake washing or sparging must be used. Sparge liquor is added to the mash at a pre-determined rate and in accordance with the required sparge-to-wort ratio. The higher the sparge rate used, the lower the gravity of the final wort collected, and the higher the percentage extract recovery achieved. The sparging rate can be adjusted in order to obtain the desired wort gravity. The sparging may be carried out continuously or batch-wise. In the former case sparge liquor is fed continuously to the mash vessel while wort is being withdrawn from the filter. Alternatively, when a certain amount of wort has been collected, sparge is metered into the mash vessel according to the specified sparge-to-wort ratio.

Step (3): Recovery of last runnings

When the required amount of wort extract had been recovered by sparging, i.e. the gravity of the wort being collected has reached the lowest allowable value, addition of liquor can be stopped. To increase total extract recovery the relatively small amount of extract remaining in the spent grains can be removed (as "last runnings") by further cake washing (sparging). The last runnings are recycled back to the mashing vessel for mashing the next batch of malt. In this way the percent extract yield achieved can be very high (e.g. 98%).

Step (4): Thickening of spent grains

It is desirable to produce spent grains with as low a moisture level as possible. At the end of the collection of wort and last runnings (steps 2 and 3), the spent grains can be dewatered by cross-flow micro-filtration during which there is no addition of sparge liquor. It is also possible to employ any other available dewatering system, such as screens and decanter centrifuges, for this phase of operation. The last runnings collected during this step may be added to that obtained during step (3) and recycled for use into the next mash as mashing-in liquor.

Once enough wort has been collected from the first stage (first Wort), it is then clarified (otherwise called "polished") through a second stage to achieve the desired clarity. The arrangement of the second stage plant can be based on cross-flow filtration or some other filtering means.

Figure 3:
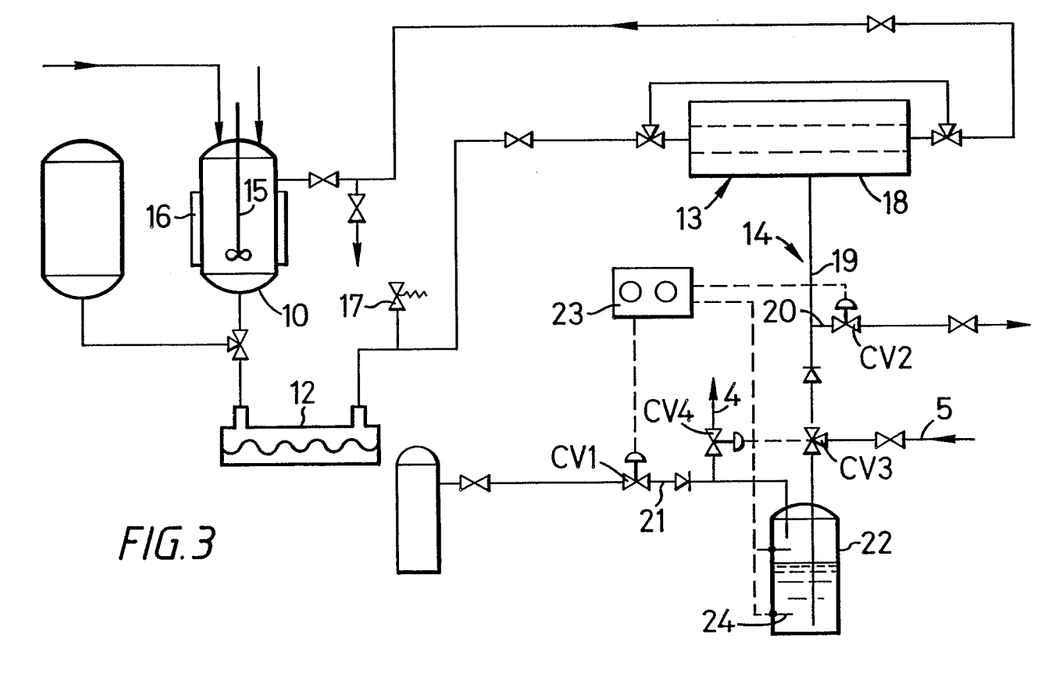
FIG. 3 is a similar diagram of a wort separation plant including a circuit corresponding to FIG. 2.

Referring now to FIG. 3, a plant for wort preparation based on cross-flow separation comprises four main units, that is a mashing vessel 10, a circulation pump 12, a cross-flow filter module 13 and a back-flushing system 14. The mashing vessel 10 has a stirrer 15 jacket 16 through which steam or hot water may be circulated in order to adjust the mash temperature. For separation purposes, the mash is circulated with a positive pump 12 in conjunction with a pressure relief valve 17. This type of pump is preferred so that break-up of mash particles is avoided. The filter module 13 is a shell and tube filter as shown in FIG. 1. The mash is circulated through the inside of the filter tubes. The permeate (wort) collects on the shell side of the filter tubes and is then discharged along lines 19 and 20 through valve CV2. If backflushing is needed, system 14 provides a means of passing either permeate (wort) or hot water (sparge liquor) back through the filter elements. Reversal of the flow of liquid is achieved by opening valve CV1 to allow gas pressure to flow along line 21 to a backflushing reservoir 22. A timer 23 controls valves CV1 and CV2 in order to carry out this backflushing operation at regular intervals. When CV2 is closed and CV1 is opened, hot water or wort from the backflushing reservoir 22 flows along line 19 into the shell side of the filter tubes in the module 13. It is arranged that this backflushing occurs once every few minutes of forward flow (wort flow), each time for a short period of about 0.5–1 second. An automatic control arrangement in the timer 23 is used to depressurise to vent 4 (valve CV4 opened) and refill from supply 5 (valve CV3 opened) the backflush reservoir 22 with hot water, once a lower liquid level sensor 24 in the reservoir is actuated. When permeate (wort) rather than sparge liquor (water) is used for backflushing, the permeate can be passed through the backflush reservoir 22 before it is discharged into a receiving vessel. After initial start-up, the reservoir will therefore contain sufficient wort for backflushing.

The invention will be further illustrated by the following Examples.

EXAMPLE I

Figure 4:
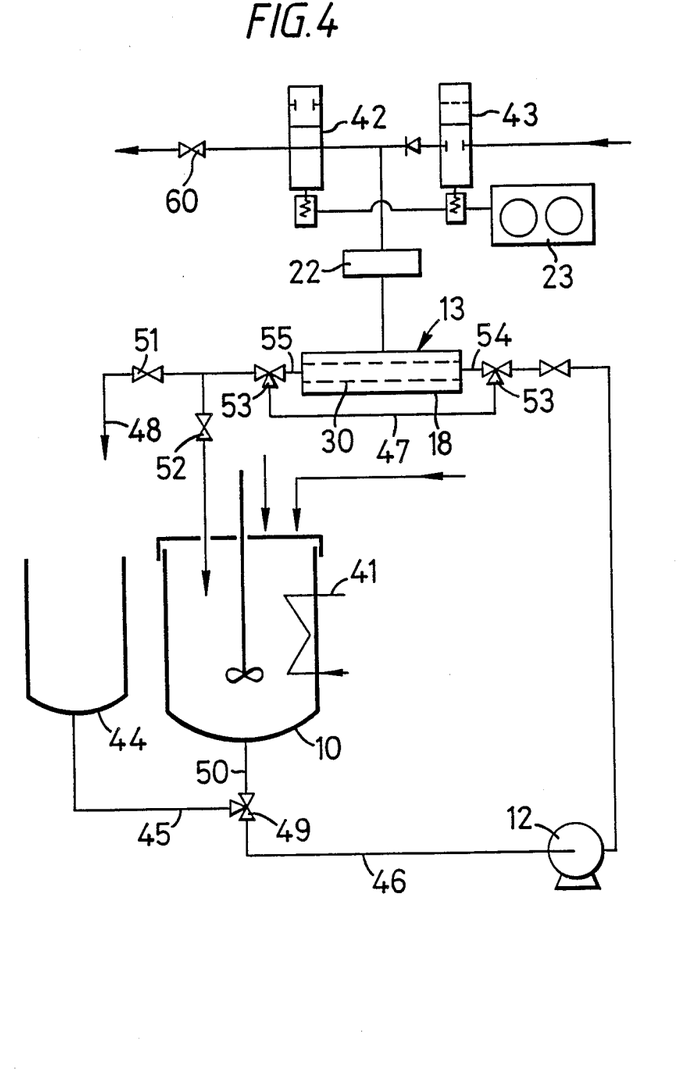
FIG. 4 is a diagram of a pilot plant for wort separation in accordance with the present invention.

A pilot plant was set up as shown in FIG. 4. Mashing was carried out in a stirred vessel 10 with a 66 L working volume. Flow of steam through an internal coil 41 placed inside the vessel provided the means of heating the water (liquor) and mash to the required temperatures. Mash circulation was by a centrifugal pump 12 of size 2/3/11 (APV Co. Ltd.) with a 140 mm diameter impeller. The filter module 13 consisted of a 64 mm diameter shell 18 within which tubular filters 30 of various materials could be housed. The filters were 25.5 mm in outside diameter and 390 mm long. Backflushing (if necessary) was achieved by using $N_2$ gas pressure applied to the top of the backflush reservoir 22. The permeate 42 and backflush 43 control valves were operated automatically by a timer 23 or through a manual override by using manual switches (not shown). The tubular filter to be tested was placed in the filter housing ensuring that it was centralised. Water from the tank 44 was circulated through the plant along the lines 45, 46, 47, by-passing the filter 13, and out to drain 48. The plant was set to the required feed flow rate and pressure conditions on the circulating feed side. The water was allowed to flow through the filter medium 30 and the conditions on the permeate side were checked. During this stage the backflushing system was tested. Water circulation was stopped and it was ensured that the mashing vessel 10 was isolated from the separation system. Forty-five liters of water (liquor) were added to the mashing vessel 10 and steam was allowed to flow through the internal coil 41 to raise the liquor temperature to that required for mashing. The initial liquor temperature (striking liquor) is normally higher than the mashing temperature since addition of malt flour reduces that temperature. In these trials, the striking liquor temperature was set to 69° C. to obtain a mash temperature of 65° C. Ale malt was milled in a Boby "C" mill at a setting of 0.635 mm and the malt flour was added manually over a period of 2-3 minutes to the hot (69° C.) striking liquor. The mash was allowed to stand with continuous stirring for the required period of mash conversion (1-2 hours). Once the mashing stage had been completed the feed pump 12 was started and water was circulated through the separation system, by-passing the filter 13, and was sent to drain 48. The three-way cock 49 at the outlet of the mashing vessel 10 was opened to the mash vessel side 50 (closed to the water tank side 45) and mash was allowed to flow into the feed pump 12. This mash chased the water out of the separation system and once mash reached the drain outlet 48, the drain valve 51 was closed and the return valve 52 to the mashing vessel 10 was opened. The plant was set to the required conditions of flow rate and back pressure while the mash was circulating through the by-pass 47 of the filter 13. The three-way cocks 53 at the inlet 54 and the outlet 55 of the tubular filter 13 were then turned over to allow flow of mash through the filter 13. The permeate was allowed to flow in a controlled manner out of the filter by opening the control valve 42 and adjusting a manual back pressure valve 60 to obtain the required pressure differential across the filter membrane 30. The initial permeate flow rate obtained was normally high and, if the filter was operated at this rate, carry-over of the particles into the membrane 30 might occur, causing severe fouling of the membrane. The permeate flow rate dropped with time during first stage step (1) operation due to thickening of the mash. Similarly, this phenomenon occurred during step (2) operation when batch-wise sparging was used. Associated with this is an increase in the pressure differential across membrane 30. Addition of the required amount of sparge liquor resulted in increasing the permeate rate to almost its original value. Backflushing with hot water was used to remove any fouling present in the filter membrane 30. Nitrogen gas was used, instead of air, to pressurise the backflushing reservoir, in order to avoid any possible oxidation of the wort. During backflushing, the permeate control valve 42 was closed and the gas control valve 43 was opened according to a time sequence using a time switch controller 23 (Cyclic Timer, Tempatron Ltd.). Gas pressure was increased in the backflush reservoir 22 to a value which was 35 to 70 kPa (5 to 10 psi) above that of the circulating mash inside the filter element 30. Hot sparge liquor (water) flowed in the reverse direction of permeate through the filter 30 to flush out any entrapped solid particles.

In an alternative method of operation, the backflush was applied through the collected wort. In this case, wort was passed through the reservoir 22 before leaving the system. The flow direction of wort was reversed to backflush the filter 30, using $N_2$ gas pressure as described above.

In one trial, a porous metal tubular filter (Sintercon bronze grade C) with a particle retention of 15 to 20 μm was fitted into the filter module and tested. To the mashing-in vessel, 45 L of water was added and heated to 69° C. and 12.3 kg malt grist was manually fed into the vessel with the stirrer switched on. The mash was allowed to stand for 30 minutes at 64° C. and for 90 minutes at 74° C. Samples of mash were taken at regular intervals centrifuged at 4000 rpm for 10 minutes in order to determine the wort specific gravity. The final specific gravity reached after the two hour stand was 1.072.

Wort separation was carried out after the two hour mash stand was completed. The mash was circulated through the filter with an average velocity of 1.8 to 2.1 $m.s.^{-1}$. The gauge pressure of the feed line was between 140 and 210 kPa (20 to 30 psig), and on average was 152 kPa (22 psig) while that in the permeate line was about 35 kPa (5 psig). The average permeate flux rate was 4174 $Lh^{-1} m^{-2}$ and, when backflushing with water at 65° C. was used, 41 liters of wort were collected with a specific gravity of 1.045. During this trial, sparge liquor addition rate was lower than the rate of wort production. Thus, the mash volume was reduced from 51 to 32 liters, with consequent thickening of the mash, that is, the final spent grains. Extract recovery by sparging (washing) was achieved either by continuous addition of sparge liquor to the feed tank or by stage-wise washing. In the latter case, for each washing stage, the mash volume was allowed to fall and an amount of liquor was added to bring the mash to the original volume. This process was repeated a number of times until most of the extract (>95%) had been recovered. Some solid particles passed through the filter element and were present in the wort.

EXAMPLE II

As in Example I, a mash was prepared in the mashing vessel, except that in this case the mash was allowed to stand at 65° C. for 2 hours and the liquor-to-grist ratio used was 3.3 to 1.0. The filter medium tested in this trial was a polyester circular woven tube. The polyester cloth with 80 μm pore size was slipped over a support. The mash circulation velocity was in the range of from 1.8 to 2.1 $ms^{-1}$ and the feed pressure (gauge) was $2.4 \times 10^5$ Pa (35 psig) while that of the permeate side was of the order of $3.4 \times 10^4$ Pa (5 psig). A permeate flux of approximately 4410 $Lh^{-1} m^{-2}$ was achieved. From an initial mash of 51 L, with backflushing with hot water at 65° C. at a very low frequency of 1 sec in every 5 minutes, 54.5 liters of wort of a specific gravity of 1.039 were collected. Due to the coarse nature of the filter some solids passed through it. Under cross-flow conditions, and using backflushing, adequate filtration of wort from brewery mash was achieved.

EXAMPLE III

This was as in Example II, except that the mashing was carried out with a liquor-to-grist ratio of 3.7. A commercial porous plastics tube (Filtroplast KA/F porous plastic filter element, type KA10) with an average pore size of 15 μm was fitted into the filter module. The internal diameter was 25 mm and its length was 390 mm. The pressure (gauge) used on the feed line was $2.62 \times 10^5$ Pa (38 psig) while that on the permeate line was about $1.38 \times 10^5$ Pa (20 psig). The permeate flux rate obtained was from 491 to 733 Lh $^{-1}$m$^{-2}$ and during the period of the trial 27 L of 1.039 specific gravity wort was collected. For this filter some solid particles were not retained and were found to be present in the work.

EXAMPLE IV

Mashing was carried out as in Example II. A test trial using a fire hose placed on a 2.5 cm diameter support showed that adequate separation of wort at a flux rate of 2250 Lh$^{-1}$ m$^{-2}$ was achieved. Back-flushing was employed as before and the pressures in the feed and permeate lines were 200 kPa (29 psig) and 70 kPa (10 psig) respectively.

EXAMPLE V

This was as in Example I except that a stainless steel mesh filter (Locker Wire Weave Ltd.) with a pore size of 80 μm was fitted into the filter module and tested. To the mashing-in vessel, 45 L of water was added and heated to 69° C. and 13.64 kg ale malt grist was manually fed into the vessel with the stirrer switched on.

The mash was allowed to stand for 60 minutes at 65° C.

Wort separation was carried out after the one hour mash stand was completed. The mash was circulated through the filter with an average velocity of 4 to 5 m.s.$^{-1}$. The gauge pressure of the feed line was between 140 and 210 kPa (20 to 30psig), and one average was 180 kPa (26 psig), while that in the permeate line was 70 to 172 kPa (10 to 25 psig). The average permeate flux rate determined over steps 1 and 2 was 1350 Lh$^{-1}$m$^{-2}$ and, without the use of backflushing 85 liters of wort were collected with a specific gravity of 1.046 and with a solids content of 1.70% w/v (see trial 1 in Table 1 below). The mash volume was reduced from 57 L to 30 L during step 1 and from 30 L to 15 L during steps 2 and 3, while in step 4 the spent grains volume decreased from 15 L to 10 L.

EXAMPLE VI

Wort from first stage operation, as in Example V, was clarified using a pilot plant similar to that shown in FIG. 4. The available filter module consisted of seven polypropylene tubes with an internal diameter of 5.5 mm and a length of 500 mm (Membrana GmbH). The membrane had a pore size of 0.2 μm. The feed wort was transferred to the feed vessel and kept hot (55° C.) during processing. Automatic back-flushing for 0.25 second with wort was employed at 15 second intervals. Wort with a clarity of 1.40° EBC was produced at a rate of 38 Lh$^{-1}$m$^{-2}$ and with an analysis set out in Table 2.

EXAMPLE VII

In this investigation, wort was separated from mash produced from various types of malts and adjuncts. All other conditions and procedures were the same as those described in Example V. Without exception the grists yielded high permeate rates (see Table 1). Collection of wort was terminated when the specific gravity of the total collected wort reached 1.038 to 1.047. No difficulties were experienced with mashes containing unmalted adjuncts.

EXAMPLE VIII

This was as in Example V, except that the ale malt was finely ground. The malt was initially milled as described in Example V and the resultant grist was then re-milled in the Boby mill at a setting of 0.381 mm roller gap. An overall flux rate of 1140 Lh$^{-1}$m$^{-2}$ was obtained. The volume of wort collected was 82 L with a specific gravity of 1.046. Sieve analysis of this malt grist and of that used in Example V are compared in Table 3.

EXAMPLE IX

Ale malt grist devoid of the husk fraction was mixed with liquor as in Example V. Sieve analysis data was given in Table 3. The overall flux rate was 880 Lh$^{-1}$m$^{-2}$ and 85 liters of wort of a specific gravity of 1.043 were collected.

EXAMPLE X

Mashing and wort separation trials were carried out as in Example V, except that the liquor-to-grist ratio was varied betwen 2.0 to 1 and 3.7 to 1, see Table 4. As expected, production of wort of high gravity was shown to be feasible by mashing with a smaller amount of liquor per unit weight of malt grist used., For the case of a liquor-to-grist ratio of 2.0 to 1 the liquor (27 L) was circulated through the plant during malt grist (13.64 Kg) addition in order to aid mixing. The mash was kept circulating throughout the one hour mash stand period. No problems were experienced with the separation of wort from this thick mash. Collection of wort for brewing was stopped at the desired gravity and the last runnings were recycled as liquor for the next mash. Fifty liters of wort with a specific gravity of 1.073 were collected.

In another experiment 18.2 Kg malt grist was mashed with 45 litres of liquor (without circulation) to obtain a liquor-to-grist ratio of 2.5 to 1. 65 litres of wort with a specific gravity of 1.064 were collected.

For 3.7 to 1 liquor-to-grist ratio, 12.2 Kg malt grist was mashed with 45 L of liquor.

EXAMPLE XI

Tubular filters of various materials of different pore sizes were used for wort separation trials. The conditions and method of operation was as in Example V. High flux rates and adequate wort separation was achieved in these trials, see Table 5.

TABLE 1

| | | Wort Separation - Mashing with Various Malts and Adjuncts | | | |
|---|---|---|---|---|---|
| | | Overall Permeate | Collected Wort | | |
| Trial No. | Grist | Flux Rate L.h.$^{-1}$m$^{-2}$ | Volume L | Specific Gravity | % Solids W/V |
| 1 | Ale Malt | 1350 | 85 | 1.046 | 1.70 |
| 2 | Lager Malt | 1200 | 85 | 1.044 | 1.43 |
| 3 | Distillery Malt | 1050 | 82 | 1.046 | 1.16 |
| 4 | 20% Extruded Wheat and 80% Ale Malt | 1140 | 85 | 1.040 | 1.96 |
| 5 | 20% Flaked Barley and 80% Ale Malt | 900 | 84 | 1.038 | 1.09 |

TABLE 1-continued

Wort Separation - Mashing with Various Malts and Adjuncts

| Trial No. | Grist | Overall Permeate Flux Rate L.h.$^{-1}$m$^{-2}$ | Collected Wort Volume L | Specific Gravity | % Solids W/V |
|---|---|---|---|---|---|
| 6 | 30% Flaked Maize and 70% Lager Malt | 1400 | 85 | 1.043 | 1.64 |
| 7 | 30% Flaked Rice and 70% Lager Malt | 1500 | 85 | 1.044 | 2.60 |
| 8 | 20% Wheat Flour and 80% Ale Malt | 1150 | 83 | 1.042 | 1.97 |
| 9 | 30% Wheat Flour and 70% Ale Malt | 1350 | 85 | 1.046 | 2.00 |
| 10 | 20% Wheat Malt and 80% Ale Malt | 1250 | 85 | 1.047 | 2.20 |

TABLE 2

Wort Analysis

| pH | 5.54 |
|---|---|
| Colour | 8.1 °EBC |
| Specific Gravity | 1.041 |
| Haze | 1.40 °EBC |
| Fermentability (yeast) | 78% |

Note:
EBC = European Brewing Convention

TABLE 3

Sieve Analysis Data of Various Malt Grists

| Sieve Size | Ale Malt Standard Grind (0.635 mm gap) % | Ale Malt Fine Grind (0.385 mm gap) % | De-husked Malt Flour % |
|---|---|---|---|
| 2.0 mm | 4.4 | 0.6 | 0.4 |
| 1.0 mm | 28.1 | 14.4 | 21.4 |
| 700 μm | 18.5 | 15.5 | 27.8 |
| 500 μm | 14.5 | 12.0 | 15.2 |
| 425 μm | 4.7 | 7.3 | 4.6 |
| 300 μm | 13.0 | 12.6 | 13.1 |
| 250 μm | 2.5 | 7.5 | 1.3 |
| 150 μm | 8.3 | 12.6 | 8.4 |
| 75 μm | 2.8 | 15.2 | 5.7 |
| 75 μm | 3.2 | 1.6 | 2.0 |

TABLE 4

Wort Separation - with various liquor:grist ratios

| Trials Liquor:grist Ratio | Overall Permeate Flux Rate L.h.$^{-1}$m$^{-2}$ | | Collected Wort/ Last Runnings Volume L | Specific Gravity | % Solids W/V |
|---|---|---|---|---|---|
| 2.0:1 (Ale Malt) | 1400 | Wort: Last Runnings: Total: | 50 35 85 | 1.073 1.005 1.045 | — — 1.9 |
| 2.5:1 | 800 | Wort: | 65 | 1.064 | 2.0 |
| (Ale Malt) | | Last Runnings: | 70 | 1.045 | 1.7 |
| 3.7:1 (Lager Malt) | 850 | Last Runnings: | not collected | | |

TABLE 5

Wort Separation - Trials with Various Filter Media

| Filter Material | Pore Size μm | Overall Permeate Flux Rate L.h$^{-1}$m$^{-2}$ | Volume L | Collected Wort Specific Gravity | % Solids W/V |
|---|---|---|---|---|---|
| 1. Nylon Monofilament | 70 | 1000 | 80 | 1.046 | 1.31 |
| 2. Polypropylene Monofilament | 70 | 1800 | 82 | 1.048 | — |
| 3. Stainless Steel Mesh | 40 | 800 | 75 | 1.048 | 0.70 |
| 4. Polyester* Monofilament | 80 | 1100 | 98 | 1.046 | — |

*Liquor-to-Grist ratio was 2.5:1

I claim:

1. A method of preparing wort from malted grain, which comprises the operations of mashing the malted grain in the presence of a preheated liquor to provide a spent grain-wort mash, and separating the wort from the spent grain; and wherein the operation of separating is a barrier cross-flow separation method accomplished by flowing the spent grain-wort mash across the surface of a wort-permeable separator element having a pore diameter in a range of from 10.0 to 100.0 μm to permit wort to pass as filtrate through the separator in a direction transverse to the direction of said flow while restraining passage of the spent grain.

2. The method according to claim 1 wherein said separating is performed by flowing the spent grain-wort mash through at least one cylindrical separator element having an inside diameter of at least 10 mm.

3. The method according to claim 2 wherein the inside diameter of the separator element is at least 20 mm.

4. The method according to claim 2 wherein the mash is flowed through a plurality of the cylindrical separators, arranged mutually parallel within a shell which receives the filtrate.

5. The method according to claim 1 wherein the separating operation comprises an initial step in which make-up liquor is added to the mash to compensate for loss of wort as filtrate, and a final step in which the spent grain is dewatered to increase its solids content.

6. The method according to claim 5 wherein the separating operation comprises:
   (i) a first step of separating wort to reduce the volume of the mash;
   (ii) a second step in which make-up liquor is added, as in said initial step;
   (iii) a third step in which further make-up liquor is added, thereby to dilute the wort, and the resultant wort is diverted and retained for use as make-up liquor in a subsequent preparation of wort; and
   (iv) a fourth step in which the spent grains are dewatered to increase their solids content.

7. The method according to claim 1, including the step of clarifying the separated wort.

8. The method according to claim 1 wherein the mash is flowed across the separator element at a velocity in a range of from 4 to 6 m/s.

9. The method according to claim 1 in which a differential pressure is applied across the separator element which is in a range of from 35 to 70 kPa.

10. The method according to claim 1 in which the mash includes more than 10% of cereal adjunct.

11. The method according to claim 6 wherein the separated wort in step (i) has a specific gravity of at least 1.045.

12. The method according to claim 3 wherein the mash is flowed through a plurality of the cylindrical separators, arranged mutually parallel within a shell which receives the filtrate.

* * * * *